United States Patent [19]

Horie et al.

[11] Patent Number: 4,785,225
[45] Date of Patent: Nov. 15, 1988

[54] CONTROL APPARATUS FOR AN INDUCTION MOTOR

[75] Inventors: Akira Horie, Katsuta; Yoshiji Jimbo, Katsuta; Kingo Abe, Katsuta; Jinkoo Choo, Kashiwa; Seiki Amikura, Katsuta; Yozo Tsuzuki, Katsuta, all of Japan

[73] Assignee: Hitachi, Ltd., Tokyo, Japan

[21] Appl. No.: 105,234

[22] Filed: Oct. 7, 1987

[30] Foreign Application Priority Data

Oct. 8, 1986 [JP] Japan .............................. 61-237965
Feb. 4, 1987 [JP] Japan .............................. 62-22351

[51] Int. Cl.$^4$ .............................................. H02P 1/30
[52] U.S. Cl. ..................................... 318/811; 318/778
[58] Field of Search ....................... 318/811, 778, 779; 187/119

[56] References Cited

U.S. PATENT DOCUMENTS 4,501,343 2/1985 Salihi .................................. 187/119
4,671,389 6/1987 Tanahasi ............................ 187/119

Primary Examiner—David Smith, Jr.
Attorney, Agent, or Firm—Antonelli, Terry & Wands

[57] ABSTRACT

A control apparatus for an induction motor comprises a variable voltage, variable frequency inverter feeding the motor, which is controlled by the PWM control. A secondary current component and an exciting current component of the motor are obtained by the calculation on the basis of a motor current and an actual slip frequency of the motor. From the thus obtained secondary current component, an actual torque produced by the motor is calculated. A frequency reference for the PWM control is obtained by the comparison result of the actual torque and a torque reference. A modulation factor reference for the PWM control is obtained by the comparison of the exciting current component and an exciting current reference. According to this control apparatus, the torque of the induction motor can be controlled to follow the torque reference with a high accuracy.

9 Claims, 4 Drawing Sheets

CONTROL APPARATUS FOR AN INDUCTION MOTOR

BACKGROUND OF THE INVENTION

1. Field of the Invention

The present invention relates to a control apparatus for an induction motor, and more particularly to a control apparatus suitable for the constant torque control of an induction motor driven by a variable voltage, variable frequency inverter.

2. Description of the Related Art

A control apparatus for an induction motor is well known, in which direct current (dc) power supplied by a dc power source is inverted by an inverter into alternating current (ac) power of the variable voltage and variable frequency, and the inverted ac power is fed to the induction motor. The inverter as mentioned above is usually called a variable voltage, variable frequency inverter (abbreviated as a VVVF inverter, hereinafter). In such a control apparatus, the VVVF inverter is often operated in such a manner that the ratio (V/f) of the ac output voltage to its frequency is maintained constant. The control of this type is known as a constant V/f ratio control of an inverter.

As one of examples of the application of the induction motor control apparatus as mentioned above, there is a control apparatus for electric rolling stocks having induction motors as driving main motors. In this case, dc power supplied by a trolly wire is inverted by a VVVF inverter into ac power of the variable voltage and variable frequency. The thus obtained ac power is fed to an induction motor. The VVVF inverter is operated in accordance with the constant V/f ratio control, until the output voltage of the inverter becomes its maximum voltage, and thereafter it is operated so as to increase the slip frequency of the motor, until the slip frequency reaches the value limited by the stalling torque of the induction motor.

In such a control apparatus for an electric vehicle, an inverter is controlled in accordance with a command for current to be supplied to an induction motor in order to make the motor produce the constant torque. The reason therefor is as follows.

Torque $T_M$ produced by an induction motor is approximated by the following formula (1);

$$T_M = k_1 \cdot I_M^2 \cdot \frac{R_2}{f_s} \tag{1}$$

wherein $I_M$ denotes a motor current, $R_2$ a secondary resistance of the induction motor, $f_s$ a slip frequency and $k_1$ a constant.

As apparent from the formula (1), the torque $T_M$ produced by the motor is in proportion to the square of the motor current $I_M$, since the variation of $R_2$ caused by the temperature change can be ignored and $f_s$ is automatically determined in accordance with the characteristic of the induction motor on the basis of a required torque. Accordingly, the constant torque control can be achieved by regulating the motor current at a constant value.

In the following, the explanation is made of the prior art control technique, in which the above mentioned torque control is achieved by the so-called pulse width modulation (PWM) control method of a VVVF inverter.

The motor current $I_M$ is at first detected, and the detected $I_M$ is compared with a command thereof to obtain the deviation. A reference for slip frequency of the motor is determined on the basis of the aforesaid deviation. A rotation frequency, which is in proportion to the number of revolutions of the motor, is detected, and the above obtained reference for slip frequency is added to the detected rotation frequency to provide a reference for operating frequency of the inverter, which is equal to the frequency of the output voltage of the inverter, i.e., the voltage applied to the motor.

Further, a modulation factor in the PWM control, which represents a ratio of an amplitude of a voltage control signal to that of a carrier wave signal, is so controlled that the output voltage of the inverter is in proportion to its frequency determined in the manner as described above. Namely, the inverter is controlled so as to maintain the ratio V/f in the output voltage thereof at a predetermined constant value.

In the prior art as mentioned above, however, the required torque could not always be produced. This is caused by the fact that the control of the inverter was carried out on the basis of the current command for the motor current, which is obtained by converting the necessary torque in accordance with the formula (1). There remarkably appears this tendency, especially in the control region where only the frequency is controlled after the output voltage of the inverter reaches its maximum voltage, since the relation between the motor current and the torque is very complicated in this region. Further, because of this complication, it is very difficult and troublesome to prepare a pattern for the motor current command with respect to the speed of a vehicle.

SUMMARY OF THE INVENTION

An object of the present invention is to provide an improved control apparatus for an induction motor, which comprises an inverter for converting dc power into ac power of the variable voltage, variable frequency to feed the induction motor and a controller for producing signals for operating the inverter in accordance with the PWM control method so that the torque produced by the induction motor is controlled to follow a given torque pattern with a high accuracy.

A feature of the present invention is in the following. Namely, an actual motor current and an actual slip frequency of an induction motor to be controlled are detected by respective detectors. The detected motor current is compared with a torque reference generated by a pattern generator to obtain a deviation therebetween. In this comparison, at least one of the motor current and the torque reference is converted into a torque-related control variable so that both the control variables to be compared are in the same dimension. A reference for slip frequency of the induction motor is produced in accordance with the deviation obtained in the above comparison. Further, a reference for frequency of an output voltage of the inverter is determined on the basis of the slip frequency reference obtained above and a rotation frequency of the induction motor. A controller for the inverter generates signals for operating the inverter so that it produces the output voltage in accordance with the frequency reference.

DESCRIPTION OF THE PREFERRED EMBODIMENTS

First of all, the explanation will be made of the principle underlying the present invention. Before the explanation, the symbols used therein will be listed in the following;

V: terminal voltage of an induction motor, which corresponds to output voltage of an inverter feeding the induction motor;
$E_0$: secondary induced voltage of the induction motor;
$I_1$: primary current of the induction motor, which is also represented as a motor current $I_M$;
$I_2$: secondary current of the induction motor;
$I_0$: exciting current of the induction motor;
$Z_1$: impedance of the primary side of the induction motor;
$R_1$: primary resistance of the induction motor;
$L_1$: primary inductance of the induction motor;
$Z_2$: impedance of the secondary side of the induction motor;
$R_2$: secondary resistance of the induction motor, which is represented by a resistance including the resistance of a secondary winding of the induction motor and a load resistance;
$L_2$: secondary inductance of the induction motor;
$Z_0$: mutual impedance of the induction motor;
M: mutual inductance of the induction motor;
s: slip
$f_1$: frequency of the terminal voltage V, which corresponds to the frequency of the output voltage of the inverter;
$f_r$: rotation frequency, which is in proportion to the number of revolutions of the induction motor; and
$f_s$: slip frequency, which is equal to $sf_1$.

Figure 1:
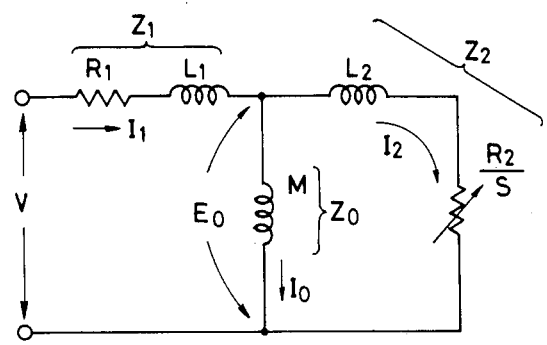
FIG. 1 shows an equivalent circuit of an induction motor for explaining the principle underlying the present invention.

In the equivalent circuit of an induction motor as shown in FIG. 1, the terminal voltage V of the induction motor is represented by the following formula (2), wherein the voltage drop caused by the primary impedance $Z_1$ is ignored for the simplification of the explanation. In fact, the voltage drop is very small, compared with that caused by the secondary and mutual impedances.

$$V \approx E_0 = k_2 \cdot f_1 \cdot I_0 \tag{2}$$

wherein $k_2$ is a constant. Accordingly, the exciting current component $I_0$ is expressed as follows;

$$I_0 = k_3 \cdot \frac{V}{f_1} \tag{3}$$

wherein $k_3$ is a constant. As apparent from the formula (3), the exciting current component $I_0$ can be controlled by the terminal voltage V and its frequency $f_1$. The exciting current component $I_0$ as represented by the formula (3) corresponds to a field current in a dc motor. If, therefore, the exciting current component $I_0$ is kept constant, the torque produced by the induction motor can be arbitrarily controlled by the secondary current component $I_2$.

The torque $T_M$ produced by the induction motor is represented by the secondary current component $I_2$ as follows;

$$\begin{aligned} T_M &= k_4 \cdot (I_2)^2 \cdot \frac{R_2}{f_s} \\ &= k_5 \cdot \frac{(I_2)^2}{f_s} \end{aligned} \tag{4}$$

wherein $k_4$ and $k_5$ are constants.

Moreover, as apparent from the equivalent circuit of FIG. 1, there exists the following relationship, in terms of the vector amount, among the primary current $I_1$, the secondary current $I_2$ and the exciting current $I_0$.

$$V = Z_1 \cdot I_1 + Z_0 \cdot I_0 \tag{5}$$

$$Z_0 \cdot I_0 = Z_2 \cdot I_2 \tag{6}$$

$$I_1 = I_0 + I_2 \tag{7}$$

From the aforesaid formulas (6) and (7), the exciting current $I_O$ in terms of the vector amount can be obtained as follows;

$$I_0 = \frac{Z_2}{Z_0 + Z_2} \cdot I_1$$

Accordingly, the above relationship can be expressed in terms of the absolute value as follows;

$$|I_0| = \left| \frac{Z_2}{Z_0 + Z_2} \right| \cdot |I_1| \tag{8}$$

Also the secondary current $I_2$ in terms of the vector amount can be obtained from the formulas (6) and (7), as follows;

$$I_2 = \frac{Z_0}{Z_0 + Z_2} \cdot I_1$$

Similarly, the above relationship can be expressed in terms of the absolute value as follows;

$$|I_2| = \left| \frac{Z_0}{Z_0 + Z_2} \right| \cdot |I_1| \tag{9}$$

The impedance ratios in the formulas (8) and (9) can be obtained by the following;

$$\left|\frac{Z_2}{Z_0 + Z_2}\right| = \tag{10}$$

$$\sqrt{\{(R_2/f_s)^2 + 4\pi^2 L_2(M + L_2)\}^2 + 4\pi^2\{(R_2/f_s)M\}^2} \times$$

$$1/\{(R_2/f_s)^2 + 4\pi^2(M + L_2)^2\}$$

$$\left|\frac{Z_0}{Z_0 + Z_2}\right| = \tag{11}$$

$$2\pi \sqrt{\{2\pi M(M + L_2)\}^2 + \{M(R_2/f_s)\}^2} \times$$

$$1/\{(R_2/f_s)^2 + 4\pi^2(M + L_2)^2\}$$

In this manner, both the ratios of the impedance are expressed as functions $F_0(f_s)$ and $F_2(f_s)$ of the slip frequency $f_s$, respectively.

Figure 2:
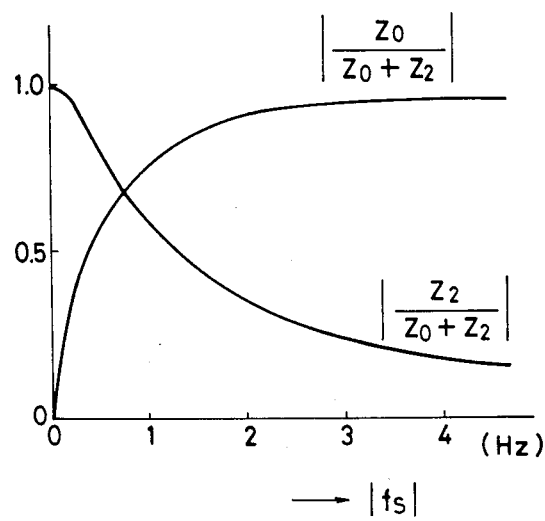
FIG. 2 is a graph showing the change of the impedance ratio in an induction motor with respect to a slip frequency.

Examples of the measured values thereof are shown in FIG. 2. As shown in the figure, $F_0(f_s)$ decreases as $f_s$ and, on the contrary, $F_2(f_s)$ increases. Further, the slip frequency $f_s$ is indicated as an absolute value in the figure, since, as described later, $f_s$ is utilized as a positive value in the powering state of the motor and as a negative value in the braking state thereof.

Both the exciting current $I_0$ and the secondary current $I_2$ can be obtained as functions of the slip frequency $f_s$ as follows;

$$I_0 = F_0(f_s) \cdot I_1 \tag{12}$$

$$I_2 = F_2(f_s) \cdot I_1 \tag{13}$$

The aforesaid functions $F_0(f_s)$ and $F_2(f_s)$ can be prepared in advance by measurement or calculation, and stored in an appropriate storage. The stored data can be read out in response to the then-present slip frequency $f_s$. The values of the functions $F_0(f_s)$ and $F_2(f_s)$ read out from the storage are multiplied with the primary current $I_1$ actually detected, whereby the exciting current $I_0$ and the secondary current $I_2$ can be obtained in accordance with the above formulas (12), (13). The torque $T_M$ can be determined in accordance with the formula (4) on the basis of the thus obtained secondary current $I_2$ and slip frequency $f_s$.

Then, a given torque command $T_{MP}$ is compared with the torque $T_M$ calculated as above to provide a deviation $\Delta T_M$ therebetween, and the slip frequency $f_s$ is controlled so as to make this deviation $\Delta T_M$ zero. To this end, as is well known, a PWM control device for the inverter is supplied with a reference $f_1$ for operating frequency of the inverter as defined below.

$$f_1 = f_r \pm f_s \tag{14}$$

wherein a plus sign is taken when the motor is in the powering state and a minus sign when it is in the braking state. As a result, the torque control of the induction motor can be performed in accordance with a desired torque command or pattern.

In the foregoing, the explanation has been made of the case where the actual torque $T_M$ calculated from the detected primary current $I_1$ is compared with the torque pattern $T_{MP}$. However, the control variables relating to the torque can be also utilized instead. Namely, the torque is converted into the torque-related control variable, such as the primary current $I_1$ or the secondary current $I_2$.

For example, a secondary current pattern $I_{2P}$ as the torque-related control variable is obtained by converting the torque pattern $T_{MP}$ in accordance with the formula (4). On the other hand, the secondary current $I_2$ is calculated from the detected primary current $I_1$ in accordance with the formula (13). The converted secondary current pattern $I_{2P}$ and the calculated secondary current $I_2$, which both are in the same dimension, are compared with each other, and the deviation $\Delta I_2$ is obtained. The slip frequency $f_s$ is calculated on the basis of the thus obtained deviation $\Delta I_2$.

Now, in the control of the inverter as mentioned above, an output voltage V of the inverter is usually controlled by the PWM control method so as to keep the ratio $V/f_1$ constant. According to a typical one of examples thereof, a reference $V_P$ for the output voltage is provided on the basis of $f_1$ obtained as above and the predetermined ratio $V/f_1$. The output voltage V of the inverter is usually controlled in accordance with the thus obtained reference $V_P$.

Further, as will be understood from the formula (3), the ratio $V/f_1$ can be maintained constant by controlling the exciting current $I_0$ at the constant value. For that purpose, there can be provided an exciting current control system, in which the current $I_0$ obtained by the calculation of the formula (12) is controlled to follow an exciting current pattern $I_{0P}$ provided in advance. Although the produced torque is usually reduced in the start of the induction motor due to the voltage drop in the primary side of the motor, this reduction of the torque can be prevented by the aforesaid exciting current control system.

As the result of the control mentioned above, the torque produced by the induction motor can be controlled to accurately follow a given torque pattern. Further, the constant torque control can be achieved not only in the variable-voltage region, in which the inverter is subject to the constant $V/f$ ratio control, but also in the voltage-saturation region, in which the inverter continues to output the maximum output voltage and the inverter frequency is increased up to the value limited by a stalling torque of the induction motor.

Figure 3:
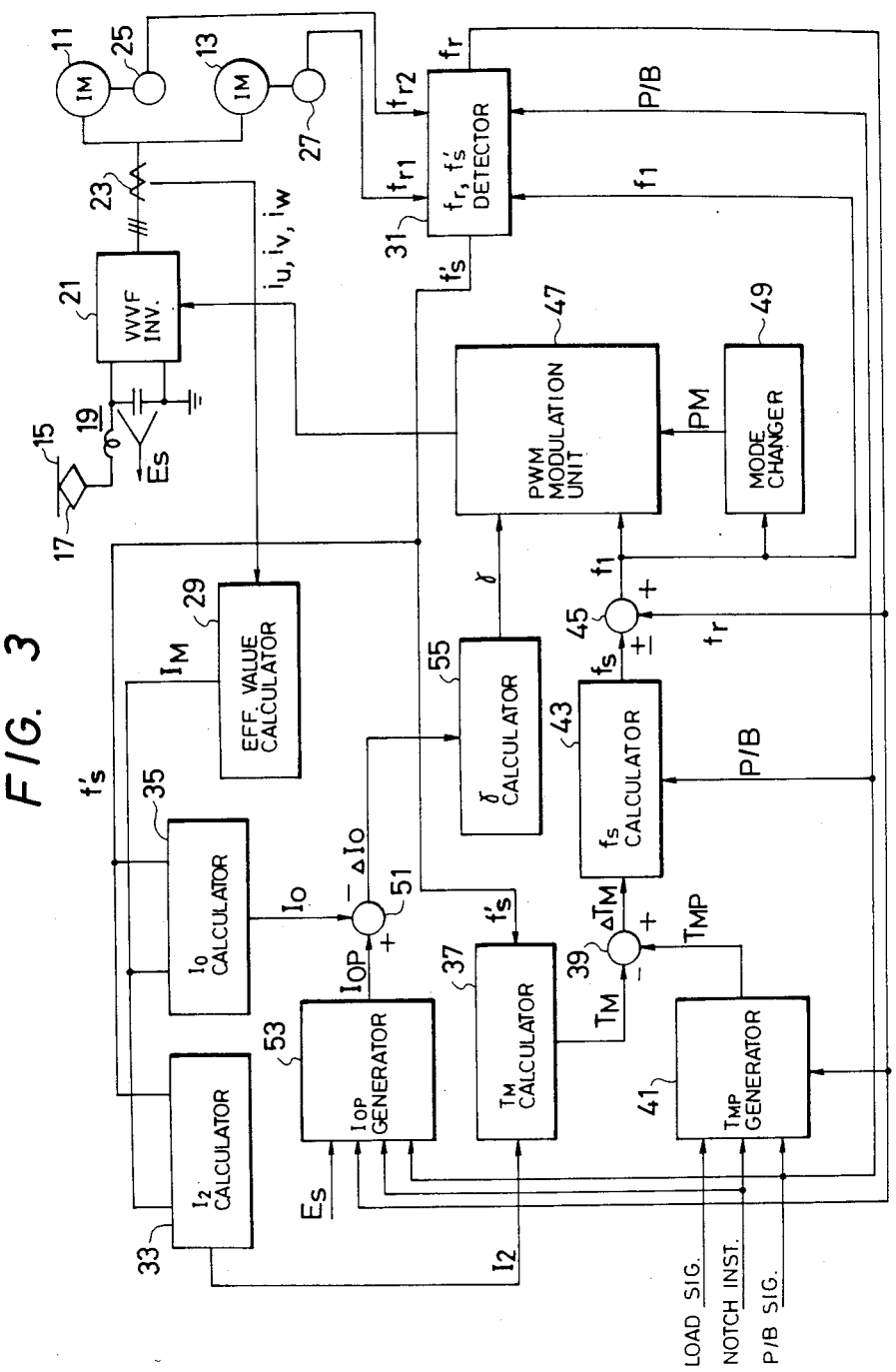
FIG. 3 is a block diagram showing a control apparatus for an induction motor according to an embodiment of the present invention.

Referring next to FIG. 3, the description will be made of a control apparatus for an induction motor according to an embodiment of the present invention.

In this embodiment, the present invention is applied to a control apparatus for an electric vehicle. First of all, a main circuit of the electric vehicle will be explained. A plurality of induction motors 11, 13 as driving motors are supplied with variable voltage, variable frequency ac power. Such ac power is obtained by inverting dc power fed from a trolley wire 15 through a pantagraph 17 and a filter 19 consisting of a reactor and a capacitor by a VVVF inverter 21. The output voltage of the inverter 21 is a three phase ac voltage, and current detectors are provided in every phase to detect currents $i_u$, $i_v$, $i_w$ flowing through respective phases. In the figure, however, they are represented by a single detector 23.

A voltage appearing across terminals of the capacitor of the filter 19 is detected as a voltage $E_s$ of the dc power source. The motors 11, 13 are provided with pulse generators 25, 27, respectively, to detect the speed of the motors 11, 13. The pulse generators 25, 27 produce signals proportional to the speed of the respective motors 11, 13 in the form of rotation frequencies $f_{r1}$, $f_{r2}$. Although the two main motors 11, 13 are shown in the figure, the present invention is never limited by the number of the main motors.

Next, the configuration of the control apparatus according to this embodiment will be described. Although the control apparatus of this kind is usually realized by a microcomputer purposively programmed and appropriate peripheral resources, the following explanation will be made of the apparatus formed by various kinds of independent, discrete devices for easy understanding of the present invention.

The outputs $i_u$, $i_v$, $i_w$ of the current detector 23 are led to an effective value calculator 29, in which the effective value of the motor current $I_M$ is calculated in accordance with the following formula;

$$I_M + 0.577 \times \sqrt{i_u^2 + i_v^2 + i_w^2} \quad (15)$$

It is to be noted that the thus calculated motor current $I_M$ is equivalent to the primary current $I_1$.

The outputs $f_{r1}$, $f_{r2}$ of the pulse generators 25, 27 are supplied for a $f_r$, $f_s'$ detector 31, in which an actual value $f_s'$ of the slip frequency is calculated in accordance with the following formula;

$$\left. \begin{array}{l} f_1 - f_{r1} = f_{s1} \\ f_1 - f_{r2} = f_{s2} \\ f_s' = (f_{s1} + f_{s2})/2 \end{array} \right\} \quad (16)$$

wherein although $f_1$ represents the inverter frequency, it will be explained more in detail later. Further, in the formula above, $f_{r1}$ and $f_{r2}$ denote rotational frequencies detected by the respective pulse generators 25, 27. Therefore, $f_{s1}$ and $f_{s2}$ mean slip frequencies occurring in the respective motors 11, 13, the average value of which is utilized as the actual slip frequency $f_s'$. Although $f_{s1}$ and $f_{s2}$ are subject to the simple average in the formula (16), other measures such as the weighted average are also possible in order to identify the actual value $f_s'$ of the slip frequency.

The detector 31 also provides the rotation frequency $f_r$. To this end, the detector 31 further has the function that selects either the maximum value or the minimum value from $f_{r1}$ and $f_{r2}$ in response to a powering or braking (P/B) signal. When the motors 11, 13 are in the powering state, the smaller one of $f_{r1}$ and $f_{r2}$ is selected, and when they are in the regenerative braking state, the larger one is selected.

The motor current $I_M$ calculated in the effective value calculator 29 and the actual slip frequency $f_s'$ detected by the detector 31 are led to a secondary current calculator 33, in which the then-present secondary current $I_2$ is calculated in accordance with the formula (13) on the basis of $I_M$ and $f_s'$. Although $I_M$ and $f_s'$ are also supplied to an exciting current calculator 35, this will be discussed in detail later.

The calculated secondary current $I_2$ is led to a torque calculator 37, to which the slip frequency $f_s'$ detected by the detector 31 is supplied. The calculator 37 calculates the torque $T_M$ in accordance with the formula (4) on the basis of $I_2$ and $f_s'$. The calculated torque $T_M$ is given to a comparator 39, which is supplied with a torque pattern $T_{MP}$ produced by a torque pattern generator 41.

The torque pattern generator 41 is furnished with following four input signals. The first one of the input signals is a load signal representative of the load condition of the electric vehicle, the second is a notch instruction given from a master controller (not shown) by an operator, the third is a P/B signal indicating that the motors 11, 13 are in the powering state or in the regenerative braking state, and the last is the rotation frequency $f_r$ from the detector 31.

Figure 4:
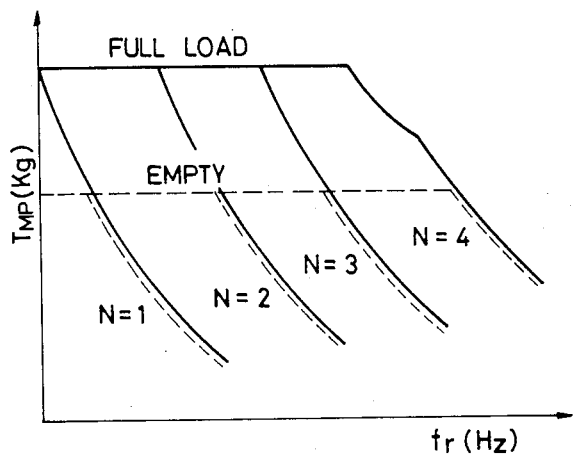
FIG. 4 shows an example of the characteristic of a torque pattern generator employed in embodiments of the present invention.

The torque pattern generator 41 receives the aforesaid four inputs and produces the torque pattern $T_{MP}$ in accordance with the characteristic as shown in FIG. 4. In the figure, the abscissa represents the rotation frequency $f_r$ as the speed signal and the ordinate the torque as the torque pattern $T_{MP}$. The notch instructions N from the first notch (N=1) to the fourth notch (N=4) are taken as a parameter. The torque pattern is shifted upward and downward in response to the load between the pattern for the full-load condition as shown by a solid line in the figure and that for the empty condition as shown by a broken line.

Further, although the torque pattern $T_{MP}$ having the same profile is generated for both the powering and the braking, the torque is somewhat larger in the pattern for the braking than that for the powering.

Returning to FIG. 3, the torque $T_M$ calculated in the calculator 37 and the torque pattern $T_{MP}$ generated in the generator 41 are compared with each other and the deviation $\Delta T_M$ therebetween is obtained. A slip frequency calculator 43 produces a reference $f_s$ for the slip frequency on the basis of the deviation $\Delta T_M$ by means of the proportional-plus-integral operation.

The output $f_s$ of the calculator 43 is led to an adder 45 with its sign according to the operational state of the motors 11, 13. When the motors 11, 13 are in the powering state, $f_s$ is positive so that it is added to $f_r$ in the adder 45, and on the contrary, when the motors 11, 13 are in the regenerative braking state, $f_s$ is negative so that it is subtracted from $f_r$. Namely, the calculation of the formula (14) is carried out in the adder 45 to produce the frequency reference $f_1$ for the inverter 21, which is supplied to a PWM modulation unit 47.

In the PWM modulation unit 47, a sinusoidal control voltage, the frequency of which is equal to the frequency reference $f_1$, is generated, and such a control voltage is compared with a carrier wave signal, which is usually a triangular wave having the frequency higher than that of the control voltage. The amplitude of the control voltage is varied in accordance with a predetermined modulation factor $\gamma$. As already described, the modulation factor represents the ratio of the amplitude of the control voltage signal to that of the carrier wave signal, by which the output voltage of the inverter 21 is regulated. Therefore, if the modulation factor $\gamma$ is set at a value in response to the frequency reference $f_1$, the inverter 21 produces the output voltage which is maintained at the constant ratio V/$f_1$.

In accordance with the result of the above mentioned comparison, gate signals are generated for controlling the on-off operation of the inverter 21. As the result of the on-off operation, the voltage and the frequency of the ac output voltage of the inverter 21 are controlled in accordance with the modulation factor $\gamma$ and the frequency reference $f_1$. Since the function and operation of this unit 47 itself is known, the further description is omitted here.

The frequency reference $f_1$ is also led to a mode changer 49, which produces a pulse mode changing signal PM to the PWM modulation unit 47. In response to the mode changing signal PM, the modulation unit 47 changes the number of waves of the carrier wave signal existing within one cycle of the control voltage. This change of mode is carried out in accordance with the frequency reference $f_1$, which corresponds to the speed of the electric vehicle.

This is for the purpose of suppressing the ripple included in the motor current $i_u$, $i_v$, $i_w$. For example, the number of waves of the carrier wave signal within one cycle of the control voltage is changed from 45 waves during the low speed region, through 27, 15, 9, and 3 waves, to one wave in the high speed region. In this respect, U.S. patent application Ser. No. 003,024 filed Jan. 13, 1987 now U.S. Pat. No. 4,723,201 titled "Control apparatus for pulse width modulation inverters" can be referred to more in detail.

In this manner, the torque $T_M$ produced by the induction motors 11, 13 can be accurately controlled in accordance with the torque pattern $T_{MP}$. In the foregoing, however, the exciting current $I_0$ is maintained constant only by controlling the ratio $V/f_1$ at the predetermined value. At the time of the start of an induction motor, however, the voltage drop in the primary side thereof can not be ignored and it is difficult to keep the ratio $V/f_1$ constant. Then, this embodiment is further provided with an exciting current control system, by which the exciting current $I_0$ is controlled in accordance with a desirable pattern.

Figure 5:
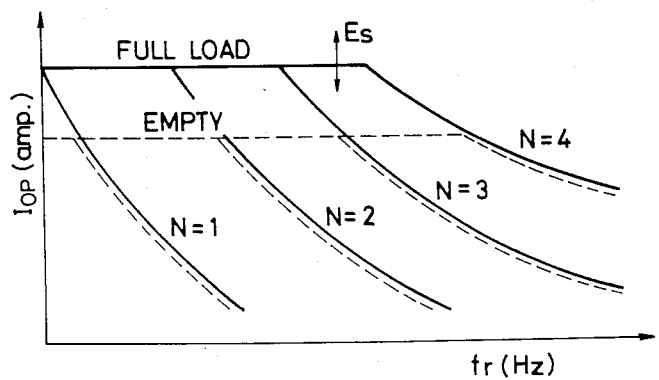
FIG. 5 shows an example of the characteristic of an exciting current pattern generator employed in the embodiments of the present invention.

In the following, the description will be done of this control system. This system comprises an exciting current calculator 35, which is supplied with the already calculated or detected motor current $I_M$ and slip frequency $f_s'$ to calculate an actual value of the exciting current $I_0$ in accordance with the formula (12). The exciting current $I_0$ calculated is led to a comparator 51, to which an exciting current pattern $I_{0P}$ is given from an exciting current pattern generator 53. The pattern generator 53 receives following four input signals, i.e., the dc source voltage $E_S$, the rotation frequency $f_r$, the notch instruction N and the P/B signal, and produces an exciting current pattern $I_{0P}$ in accordance with the characteristic as shown in FIG. 5.

In this figure, the ordinate represents the exciting current as the exciting current pattern $I_{0P}$ and the abscissa the rotation frequency $f_r$ as the speed signal of the electric vehicle. The notch instructions N from the first notch (N=1) to the fourth notch (N=4) are taken as a parameter. The characteristic is shifted upward and downward in accordance with the load of the electric vehicle, as shown by solid and broken lines. Further, the characteristic is also adjusted by the change of the dc source voltage $E_S$ as shown by an arrow in the figure. Although there is not shown an arrow in the characteristic for the empty load condition, the same is applied also to this case.

Returning again to FIG. 3, the calculated exciting current $I_0$ and the generated pattern $I_{0P}$ are compared with each other in the comparator 51 to obtain a deviation $\Delta I_0$ therebetween. The deviation $\Delta I_0$ is led to a modulation factor calculator 55, in which it is converted into the reference for the modulation factor $\gamma$ by the proportional-plus-integral operation. The calculated reference $\gamma$ for the modulation factor is given to the PWM modulation unit 47. As a result, the modulation unit 47 produces the gate signals for the switching elements of the inverter 21 on the basis of the modulation factor reference $\gamma$ which is set in accordance with the desired exciting current pattern.

As described above, according to this embodiment, the actual value of the secondary current $I_2$ of the induction motors 11, 13 is obtained by the calculation. The torque $T_M$ produced by the motors is obtained on the basis of the actual secondary current $I_2$. The thus obtained actual value of the torque TM is compared with the torque pattern $T_{MP}$, whereby the torque $T_M$ is controlled so as to follow the pattern $T_{MP}$. As a result, the accurate constant torque control of the motors 11, 13 can be realized following the torque pattern. Further, the reduction of the torque produced by the motors 11, 13 at the time of the start thereof is compensated by adding the exciting current control system, so that the constant torque control is further improved.

Figure 6:
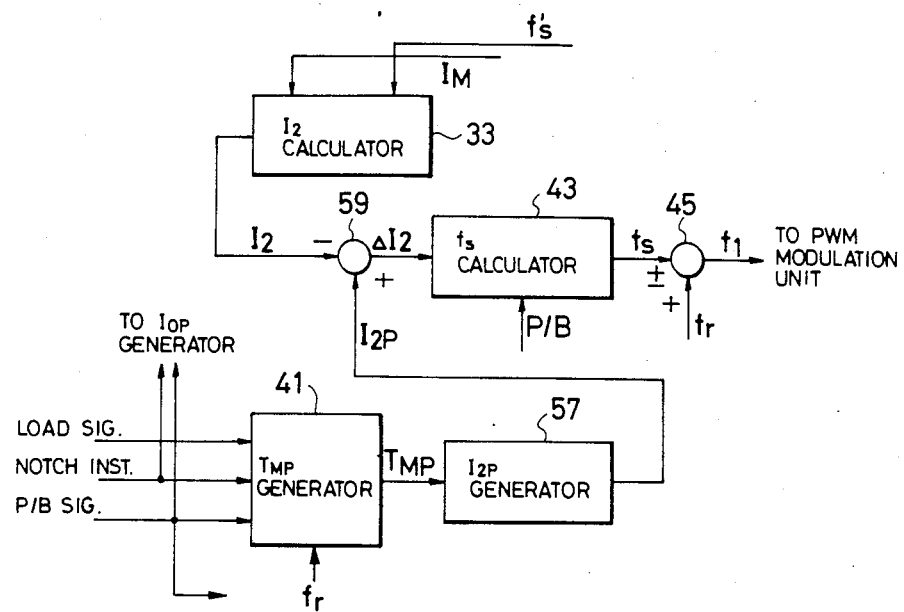
FIG. 6 is a block diagram showing another embodiment of the present invention, in which only the relevant portion is illustrated.

In the foregoing, the VVVF inverter 21 was controlled such that the actual torque $T_M$ produced by the induction motors 11, 13 follows the torque pattern $T_{MP}$. As will be understood from the formula (4), however, the torque $T_M$ can be converted into the secondary current $I_2$. Therefore, another embodiment can be realized, in which the torque pattern $T_{MP}$ is converter into the corresponding secondary current as a secondary current pattern $I_{20}$ and the thus obtained secondary current pattern $I_{20}$ is compared with the actual secondary current $I_2$ obtained by the calculation as mentioned above. FIG. 6 shows the another embodiment according to this. In the figure, however, only the relevant portion of this embodiment is shown, and portion not shown in this figure is the same as that in FIG. 3. Further, in the figure, the same reference symbols and numerals denote the same parts as in FIG. 3.

In FIG. 6, there is newly provided a secondary current pattern generator 57, in which, as described above, a secondary current pattern $I_{2P}$ is generated by converting the torque pattern $T_{MP}$ produced by the torque pattern generator 41. Thus generated secondary current pattern $I_{2P}$ is led to a comparator 59, in which it is compared with the actual secondary current $I_2$ to obtain the deviation $\Delta I_2$. In this manner, since the actual value and the reference are compared with each other in the form of the secondary current, it is of course that the torque calculator 37 in FIG. 3 becomes unnecessary in this embodiment. The slip frequency calculator 43 produces the reference $f_s$ for the slip frequency by the proportional-plus-integral operation.

Figure 7:
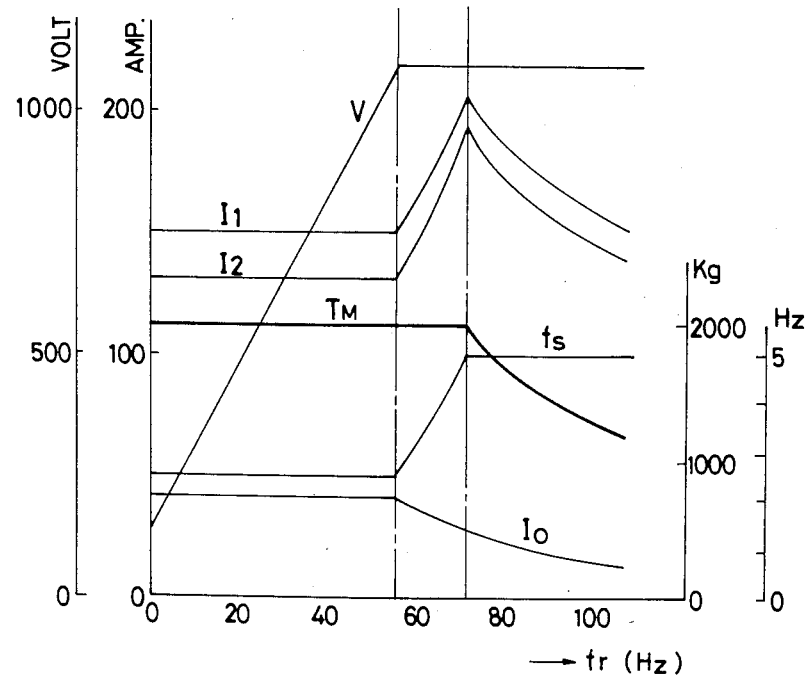
FIG. 7 shows the characteristics of various control variables when the control is carried out by a control apparatus according to the present invention.

Referring next to FIG. 7, the description will be made of the effect of the present invention. FIG. 7 shows the change of the various control variables with respect to the rotation frequency $f_r$, when an induction motor is controlled by the first embodiment of the present invention. As apparent from the figure, the terminal voltage V is linearly increased until the rotation frequency $f_r$ reaches about 53 Hz and thereafter saturated at a constant voltage. During this, the secondary current $I_2$ and the slip frequency $f_s$ are controlled at predetermined values, respectively. As a result, the torque $T_M$ is kept constant, as shown by a thick line in the figure. After the voltage V is saturated, the slip frequency $f_s$ is increased up to the value, about 72 Hz, limited by the stalling torque of the induction motor. During the increase of the slip frequency, the constant torque continues to be produced.

Although we have herein shown and described only a few forms of apparatus embodying our invention, it is understood that various changes and modifications may be made therein within the scope of the appended claims without departing from the spirit and scope of our invention.

We claim:

1. A control apparatus for an induction motor, comprising:
   a dc power source;
   inverter means for converting dc power supplied from said dc power source into ac power of the variable voltage and variable frequency to feed the induction motor; and
   modulation means for producing signals for operating said inverter means in accordance with the pulse width modulation method on the basis of a predetermined ratio of voltage to frequency in an ac output voltage of said inverter means and a reference for frequency of the ac output voltage, characterized by
   current detecting means for detecting an effective value of a motor current of the induction motor;
   frequency detecting means for detecting an actual rotation frequency and an actual slip frequency of the induction motor;
   pattern generating means for generating a reference for a torque to be produced by the induction motor;
   comparing means for comparing the motor current detected by said current detecting means with the torque reference generated by said pattern generating means to obtain a deviation therebetween, in which at least one of the motor current and the torque reference is converted so that both are torque-related control variables of the same dimension; and
   operating frequency reference generating means for calculating a reference for a slip frequency in accordance with the deviation obtained by said comparing means and obtaining the frequency reference to be given to said modulation means on the basis of the calculated slip frequency reference and the actual rotation frequency detected by said frequency detecting means.

2. A control apparatus for an induction motor as defined in claim 1, wherein there is further provided calculating means for calculating a secondary current component of the induction motor on the basis of the motor current detected by said current detecting means and the actual slip frequency detected by said frequency detecting means.

3. A control apparatus for an induction motor as defined in claim 2, wherein a torque produced by the induction motor is calculated from the secondary current component obtained by said secondary current calculating means and the actual slip frequency detected by said frequency detecting means, and said comparing means compares the calculated torque with the torque reference generated by said pattern generating means.

4. A control apparatus for an induction motor as defined in claim 2, wherein the torque reference generated by said pattern generating means is converted into a reference for a secondary current component of the induction motor, and said comparing means compares the secondary current reference with the secondary current component obtained by said secondary current calculating means.

5. A control apparatus for an induction motor as defined in claim 1, wherein there is further provided means for controlling an exciting current component of the motor current detected by said current detecting means in accordance with a desired exciting current reference.

6. A control apparatus for an induction motor as defined in claim 5, wherein the exciting current component is calculated on the basis of the motor current detected by said current detecting means and the actual slip frequency detected by said frequency detecting means.

7. A control apparatus for an induction motor as defined in claim 6, wherein the calculated exciting current component is compared with the exciting current reference to obtain a deviation therebetween, and the ratio of voltage to frequency in the ac output voltage of said inverter means is controlled in accordance with the obtained deviation.

8. A control apparatus for an induction motor as defined in claim 1, wherein a plurality of the induction motors are supplied with the ac power by said inverter means, and said frequency detecting means produces the average value of slip frequencies occurring in the plural induction motors as the actual slip frequency.

9. A control apparatus for an induction motor as defined in claim 1, wherein a plurality of the induction motors are supplied with the ac power by said inverter means, and said frequency detecting means produces the minimum value of rotation frequencies occurring in the plural induction motors as the actual rotation frequency during the powering state of the induction motors and the maximum value thereof during the regenerative braking state.

* * * * *